United States Patent
Liang

(10) Patent No.: US 8,819,314 B2
(45) Date of Patent: Aug. 26, 2014

(54) VIDEO PROCESSING SYSTEM AND METHOD FOR COMPUTER

(71) Applicant: Hon Hai Precision Industry Co., Ltd., New Taipei (TW)

(72) Inventor: Hsien-Chuan Liang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/957,566

(22) Filed: Aug. 2, 2013

(65) Prior Publication Data

US 2014/0049650 A1    Feb. 20, 2014

(30) Foreign Application Priority Data

Aug. 16, 2012    (TW) .............................. 101129811 A

(51) Int. Cl.
*G06F 13/10*    (2006.01)
(52) U.S. Cl.
USPC ............................................ 710/72; 710/62
(58) Field of Classification Search
None
See application file for complete search history.

(56) References Cited

U.S. PATENT DOCUMENTS

| | | | | |
|---|---|---|---|---|
| 5,663,951 A * | 9/1997 | Danneels et al. | ............ | 370/230 |
| 5,754,765 A * | 5/1998 | Danneels et al. | ............ | 709/222 |
| 5,912,676 A * | 6/1999 | Malladi et al. | ................ | 345/531 |
| 6,016,507 A * | 1/2000 | Carroll et al. | ................. | 709/217 |
| 6,889,385 B1 * | 5/2005 | Rakib et al. | .................... | 725/119 |
| 7,949,117 B2 * | 5/2011 | Jeong et al. | ............. | 379/202.01 |
| 8,237,765 B2 * | 8/2012 | King et al. | ................. | 348/14.01 |
| 8,269,891 B2 * | 9/2012 | Sullivan | ........................ | 348/512 |
| 8,319,814 B2 * | 11/2012 | King et al. | ................. | 348/14.01 |
| 8,429,299 B2 * | 4/2013 | Chan et al. | .................... | 709/246 |
| 8,614,732 B2 * | 12/2013 | Baird et al. | ................ | 348/14.08 |
| 2002/0040475 A1 * | 4/2002 | Yap et al. | ......................... | 725/39 |
| 2002/0054750 A1 * | 5/2002 | Ficco et al. | ..................... | 386/46 |
| 2003/0232648 A1 * | 12/2003 | Prindle | ......................... | 463/40 |
| 2008/0043643 A1 * | 2/2008 | Thielman et al. | ............. | 370/260 |
| 2010/0080283 A1 * | 4/2010 | Ali et al. | .................. | 375/240.01 |
| 2010/0091180 A1 * | 4/2010 | Liu et al. | ....................... | 348/441 |

* cited by examiner

*Primary Examiner* — Cheng-Yuan Tseng
(74) *Attorney, Agent, or Firm* — Novak Druce Connolly Bove + Quigg LLP

(57) ABSTRACT

A video processing system includes a switch apparatus connected between first and second computers. The first computer outputs a video signal including test information of the first computer to the switch apparatus. The switch apparatus obtains a resolution of the second computer, and encodes the video signal according to the resolution of the second computer. The second computer displays the test information.

13 Claims, 4 Drawing Sheets

VIDEO PROCESSING SYSTEM AND METHOD FOR COMPUTER

BACKGROUND

1. Technical Field

The present disclosure relates to a video processing system for a computer.

2. Description of Related Art

When testing a server, a user must have a monitor or display to see the test result or to observe what commands are being entered to perform the tests on the server. However, some servers are rack mounted and even some desktop servers do not include a display and this is an inconvenient.

Therefore, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
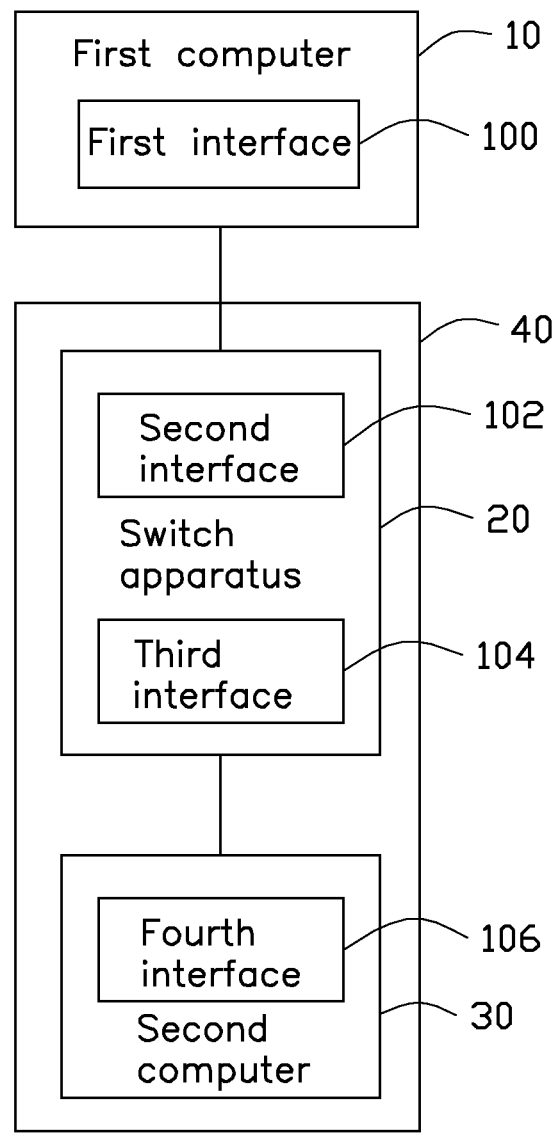
FIG. 1 is a block diagram of an embodiment of a video processing system connected to a first computer, wherein the video processing system includes a switch apparatus and a second computer.

FIG. 1 illustrates an embodiment of a video processing system 40 of the present disclosure. The video processing system 40 includes a switch apparatus 20 connected between first and second computers 10 and 30. The switch apparatus 20 receives a first video signal from the first computer 10 about test information and prompts a second computer 30 to display the test information corresponding to the first video signal. In the embodiment, the second computer 30 is a portable computer, such as a notebook computer or a tablet computer.

The first computer 10 includes a first interface 100. The first computer 10 outputs the first video signal through the first interface 100, where the first video signal includes the test information generated by performing a test on the first computer 10 as the first computer 10 malfunctions.

The switch apparatus 20 includes a second interface 102 and a third interface 104. The switch apparatus 20 receives the first video signal through the second interface 102 connected to the first interface 100 of the first computer 10. The switch apparatus 20 performs a conversation on the first video signal to generate a third video signal according to a resolution of the second computer 30, and outputs the third video signal through the third interface 104. In the embodiment, both of the first and second interfaces 102 and 104 are one of high definition multimedia interfaces (HDMI), video graphics array (VGA) interfaces, or digital visual interfaces (DVI).

The second computer 30 includes a fourth interface 106. The second computer 30 receives the third video signal through the fourth interface 106 connected to the third interface 104 of the switch apparatus 20. In the embodiment, both of the third and fourth interfaces are universal serial bus (USB) interfaces.

Figure 2:
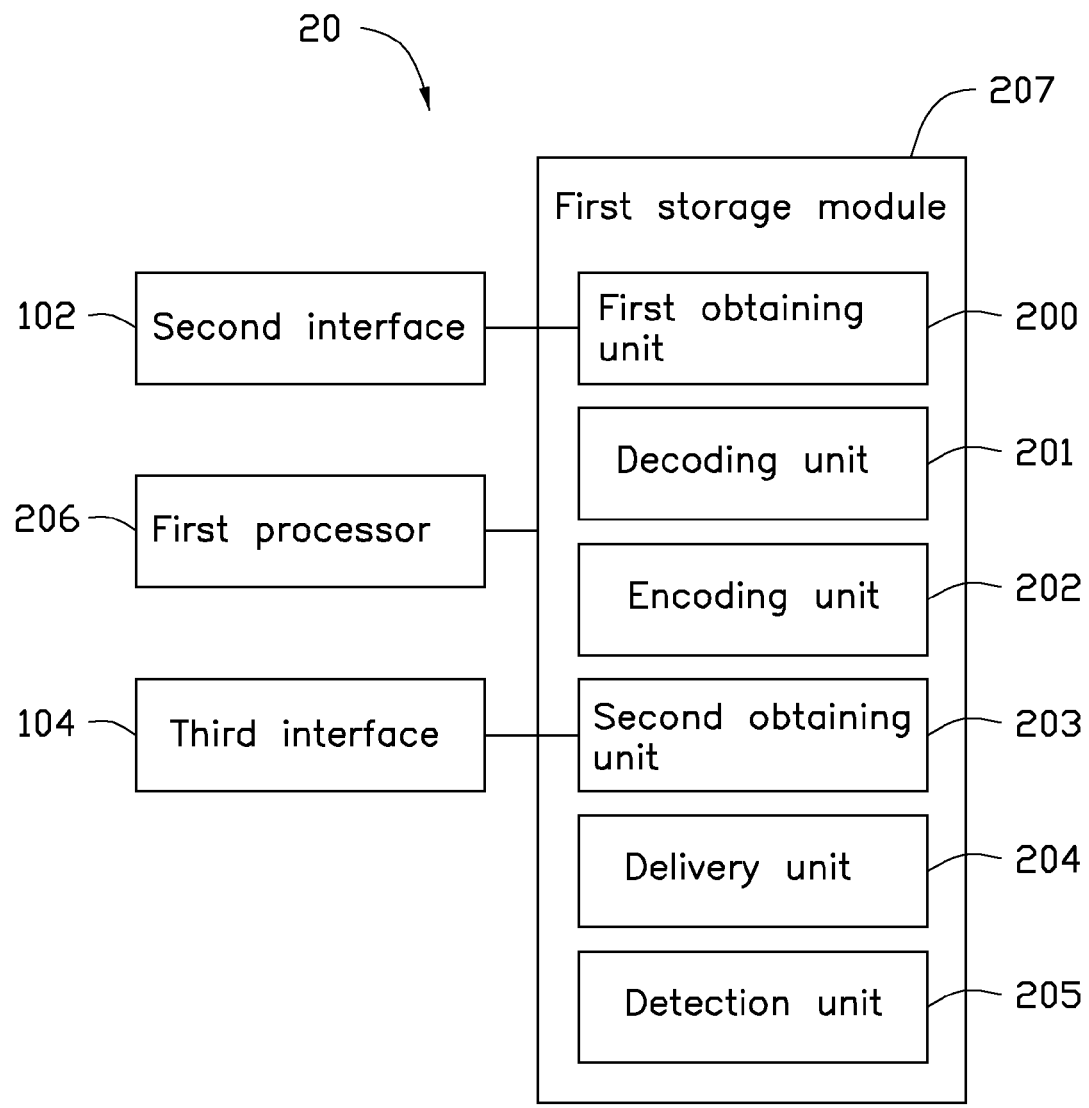
FIG. 2 is a block diagram of the switch apparatus of FIG. 1.

FIG. 2 shows that the switch apparatus 20 further includes a first processor 206 and a first storage module 207 connected to the first processor 206. The first storage module 207 stores programs to be executed by the first processor 206, and includes a first obtaining unit 200, a decoding unit 201, an encoding unit 202, a second obtaining unit 203, a delivery unit 204, and a detection unit 205.

The first obtaining unit 200 receives the first video signal from the first computer 10 through the second and first interfaces 102 and 100. The detection unit 205 determines types of the first video signal transmitted between the first and second interfaces 100 and 102, according to a frame structure of the first video signal. In the embodiment, the type of the first video signal may be HDMI, VGA, or DVI, and the type of HDMI, VGA, and DVI characterize in different frame structures. The detection unit 205 further determines type between the third and fourth interfaces 104 and 106. For example, if the second computer 30 communicates with the switch apparatus 20 through a USB interface, the detection unit 205 then determines that the type between the third and fourth interfaces 104 and 106 is the USB type interface.

The second obtaining unit 203 obtains the resolution of the second computer 30 through the third and fourth interfaces 104 and 106. The decoding unit 201 decodes the first video signal to a second video signal according to the type of the first or second interface 100 or 102, and the encoding unit 201 encodes the second video signal to the third video signal according to the type of third or fourth interface 104 or 106 and the resolution of the second computer 30. The delivery unit 204 then transmits the third video signal to the second computer 30 through the third and fourth interfaces 104 and 106.

Figure 3:
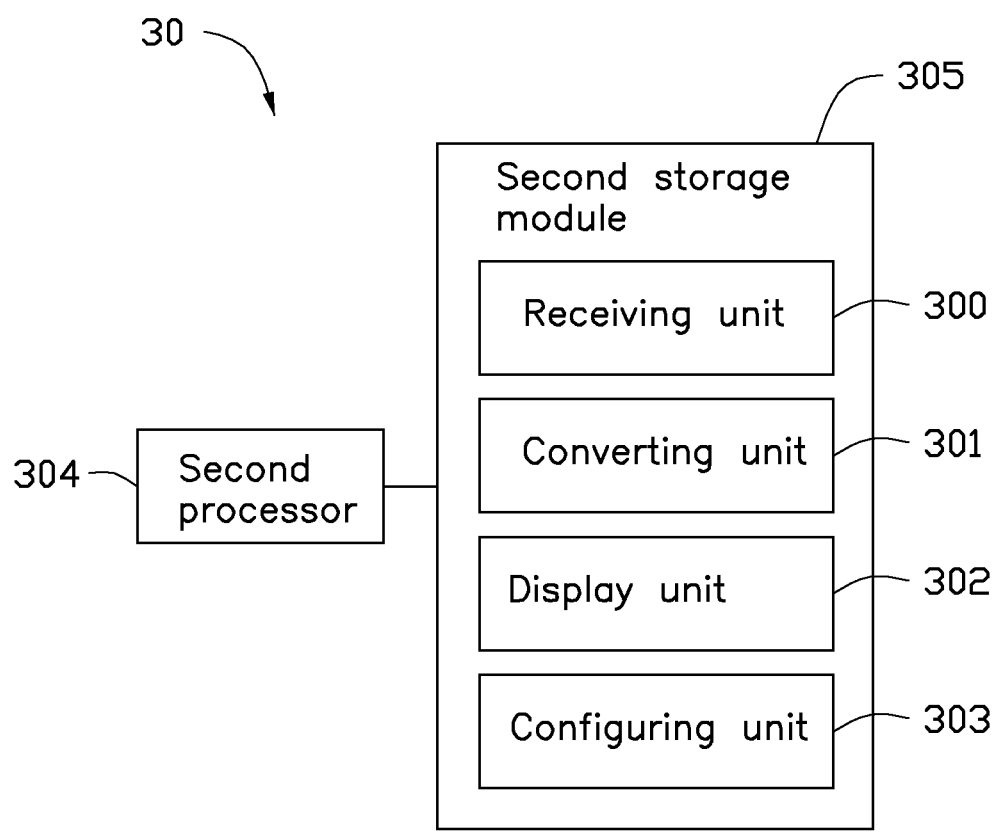
FIG. 3 is a block diagram of the second computer of FIG. 1.

FIG. 3 shows that the second computer 30 includes a second processor 304 and a second storage module 305 coupled to the second processor 304. The second storage module 305 stores a plurality of programs to be executed by the second processor 304, and includes a receiving unit 300, a converting unit 301, a display unit 302, and a configuring unit 303.

The receiving unit 300 receives the third video signal through the fourth interface 106.

The configuring unit 303 sets the resolution of the second computer 30, such as 1920*1080. In the embodiment, the configuring unit 303 is a program that operates as the second computer 30 being powered on. A user can set the resolution of the second computer 30 through operating the configuring unit 303 manually.

The converting unit 301 converts the third video signal to image data complying with the resolution of the second computer 30, and the image data is then displayed about the test information of the first computer 10 on the display unit 302.

Figure 4:
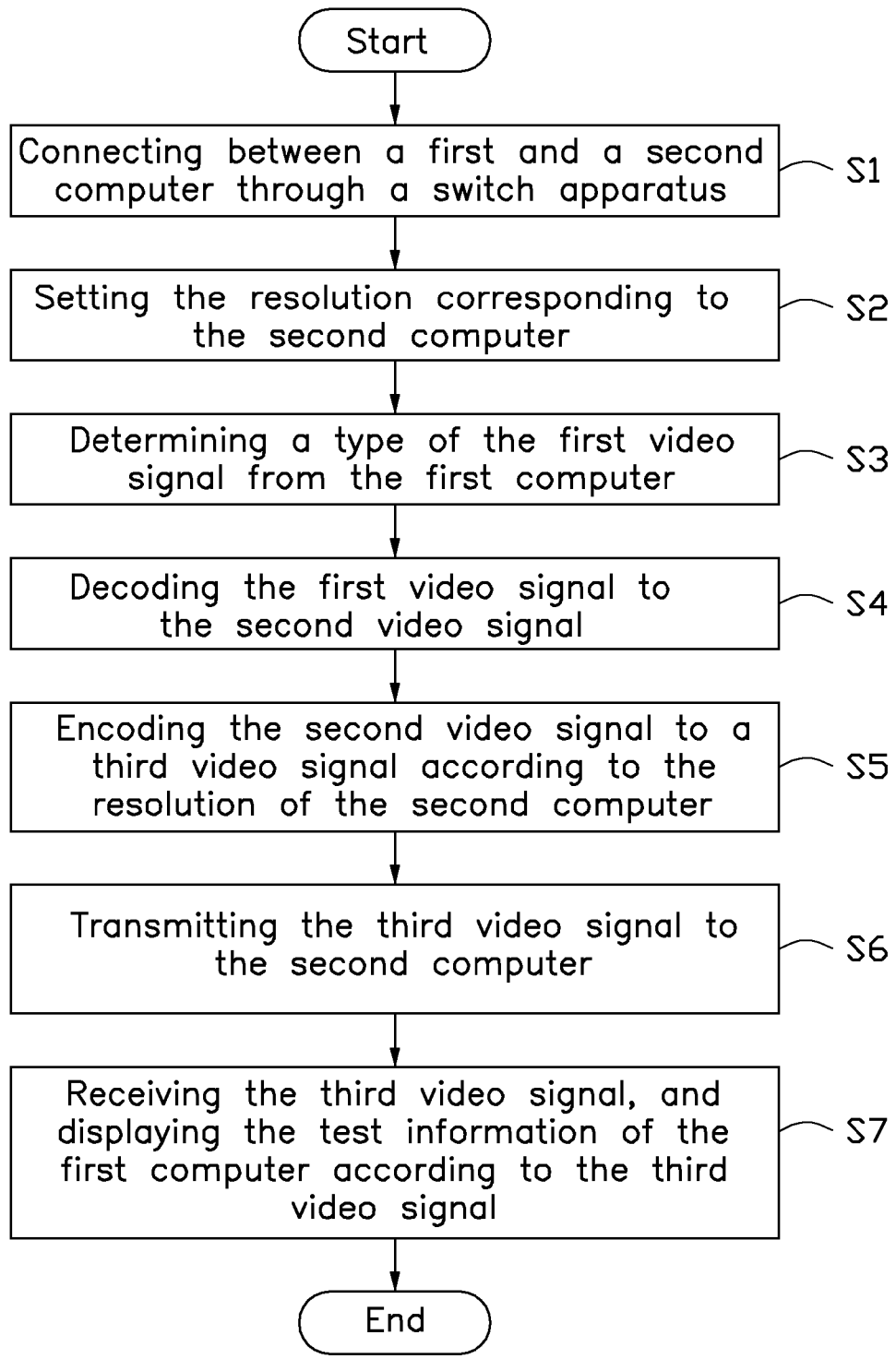
FIG. 4 is a flow chart of an embodiment of a video processing method of the present disclosure.

FIG. 4 shows a video processing method of the present disclosure, the video processing method includes steps below.

In step S1, the first and second computers 10 and 30 are connected through the switch apparatus 20.

In step S2, the resolution of the second computer 30 is set.

In step S3, the switch apparatus 20 determines the type of the first video signal from the first computer 10.

In step S4, the switch apparatus 20 decodes the first video signal to the second video signal.

In step S5, the switch apparatus 20 encodes the second video signal to the third video signal according to the resolution of the second computer 30 and the type of communication between the third and fourth interfaces 104 and 106.

In step S6, the switch apparatus 20 transmits the third video signal to the second computer 30.

In step S6, the second computer 30 receives the third video signal, and displays the test information of the first computer 10.

While the disclosure has been described by way of example and in terms of a preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A video processing system, comprising:
   a first computer;
   a switch apparatus connected to the first computer, and comprising a first processor and a first storage module storing a plurality of programs to be executing by the first processor, wherein the first storage module comprises:
      a first obtaining unit receiving a first video signal outputted from the first computer about test information of the first computer;
      a detection unit determining a type of the first video signal;
      a second obtaining unit obtaining a resolution of a second computer;
      a decoding unit decoding the first video signal to a second video signal according to the type of the first video signal; and
      an encoding unit encoding the second video signal to a third video signal according to the resolution of the second computer; and
   a second computer connected to the switch apparatus, and comprising a second processor and a second storage module storing a plurality of programs to be executing by the second processor, wherein the second storage module comprises:
      a configuring unit setting the resolution of the second computer;
      a receiving unit receiving the third video signal; and
      a converting unit converting the third video signal to image data, and displaying the image data about the test information of the first computer through a display unit.

2. The video processing system of claim 1, wherein the configuring unit is an application program executed when the second computer is powered on.

3. The video processing system of claim 2, wherein the first computer comprises a first interface, the switch apparatus further comprises a second interface and a third interface, the second computer further comprises a fourth interface; wherein the first interface is coupled to the second interface, the third interface is coupled to the fourth interface.

4. The video processing system of claim 3, wherein the first and second interfaces are high definition multimedia interfaces (HDMI).

5. The video processing system of claim 3, wherein the first and second interfaces are video graphics array (VGA) interfaces.

6. The video processing system of claim 3, wherein the first and second interfaces are digital visual interfaces (DVI).

7. The video processing system of claim 3, wherein the third and fourth interfaces are universal serial bus (USB) interfaces.

8. A video processing method, comprising:
   connecting a first computer and a second computer through a switch apparatus;
   detecting a type of a first video signal outputted from the first computer about test information of the first computer by the switch apparatus;
   decoding the first video signal to a second video signal by the switch apparatus;
   encoding the second video signal to a third video signal according to a resolution of the second computer by the switch apparatus;
   transmitting the third video signal to the second computer by the switch apparatus; and
   receiving the third video signal and displaying the test information about the first computer by the second computer.

9. The video processing method of claim 8, further comprising:
   converting the third video signal to image data by the second computer; and
   displaying the image data about the test information of the first computer by the second computer.

10. The video processing method of claim 9, wherein the first video signal is a high definition multimedia interface (HDMI) type signal.

11. The video processing method of claim 9, wherein the first video signal is a video graphics array (VGA) type signal.

12. The video processing method of method 9, wherein the first video signal is a digital visual interface type signal.

13. The video processing method of claim 9, wherein the third video signal is a universal serial bus (USB) type signal.

* * * * *